United States Patent
Nagasaku et al.

(10) Patent No.: US 6,698,802 B2
(45) Date of Patent: Mar. 2, 2004

(54) PIPE JOINT

(75) Inventors: Shigeo Nagasaku, Nishinomiya (JP); Jun Maeda, Ashiya (JP); Katsutoshi Sumitani, Amagasaki (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 10/313,021

(22) Filed: Dec. 6, 2002

(65) Prior Publication Data

US 2003/0122378 A1 Jul. 3, 2003

Related U.S. Application Data

(63) Continuation of application No. PCT/JP01/04834, filed on Jun. 8, 2001.

(30) Foreign Application Priority Data

Jun. 9, 2000 (JP) ........................................ 2000-173732

(51) Int. Cl.⁷ ................................................. F16L 15/06
(52) U.S. Cl. ........................................ 285/390; 285/334
(58) Field of Search ................................. 285/390, 334, 285/333

(56) References Cited

U.S. PATENT DOCUMENTS

| | | | |
|---|---|---|---|
| 3,388,752 A | | 6/1968 | Hanes et al. |
| 4,494,777 A | * | 1/1985 | Duret .......................... 285/55 |
| 4,830,411 A | * | 5/1989 | Tsuru et al. ................ 285/334 |
| 5,007,665 A | * | 4/1991 | Bovisio et al. ............. 285/334 |
| 5,462,315 A | * | 10/1995 | Klementich ................... 285/24 |
| 6,322,110 B1 | * | 11/2001 | Banker et al. ............... 285/334 |
| 6,412,831 B1 | * | 7/2002 | Noel et al. ................... 285/334 |
| 6,454,315 B1 | * | 9/2002 | Yamaguchi ..................... 707/5 |
| 6,485,063 B1 | * | 11/2002 | Olivier ........................ 285/333 |
| 6,530,607 B1 | * | 3/2003 | Mallis et al. ................ 285/333 |
| 2002/0027363 A1 | * | 3/2002 | Mallis et al. ................ 285/334 |

FOREIGN PATENT DOCUMENTS

| | | |
|---|---|---|
| JP | 4015385 | 1/1992 |
| JP | 4157282 | 5/1992 |
| JP | 11-223284 | 8/1999 |

* cited by examiner

*Primary Examiner*—Eric K. Nicholson
(74) *Attorney, Agent, or Firm*—Clark & Brody

(57) ABSTRACT

A pipe joint formed by screwing a pin portion having a tapered male thread formed on the outer peripheral surface of the end of a pipe into a box portion having a tapered female thread formed on the inner peripheral surface of the end of a pipe or a short pipe so as to threadingly engage with the tapered male thread, the pipe joint having the following shape:

| | |
|---|---|
| clearance C between thread stab flanks: | 0.5–1.0 mm |
| thread stab flank angle θ: | 15–60 degrees |
| thread crest surfaces and thread root surfaces: | parallel to the pipe axis |
| radius R of stab flank corner portions of male thread: | 1.0–1.25 mm |

In addition, the taper of the incomplete thread portion of the pin portion is preferably 0.96–0.90 times the nominal taper of the complete thread portion.

5 Claims, 9 Drawing Sheets

(a)

(b)

(a)

(b)

(a)

(b)

PIPE JOINT

This application is a continuation of International Application PCT/JP01/04834, filed Jun. 8, 2001. This PCT application was not in English as published under PCT Article 21(2).

TECHNICAL FIELD

This invention relates to a pipe joint for use with oil well pipes used in the exploration and production of natural gas and crude oil. In particular, it relates to a pipe joint which reduces galling of threads, which has good operability at the time of tightening, and which reduces the level of thread damage which sometimes occurs thereby.

BACKGROUND ART

Threaded joints are widely used as a technology for connecting oil well pipes used in the exploration and production of natural gas and crude oil. Threaded joints include integral types in which a pin portion is formed on one end of a pipe and a box portion is formed on the other end and two pipes are directly connected to each other, and coupling types in which two pipes having a pin portion formed on each end are connected to each other by a short pipe having a box portion formed at both ends. Below, a description will be given using a coupling-type joint as an example, but the same applies to an integral-type joint.

At the site of many gas fields and oil fields, tightening (make-up) of a joint is carried out as shown in FIG. 7.

Thus, an oil well pipe 2 having a short pipe 1 previously fastened to its end in a factory is supported with the short pipe 1 facing upwards, and the pin portion 2b of another oil well pipe 2 which is to be connected thereto is fastened to the short pipe 1. In this case, when the pin portion 2b of the oil well pipe 2 which is to be connected is inserted into the box portion 1a of the short pipe 1, the oil well pipe 2 is inserted vertically into the short pipe 1 through a plastic stabbing guide (not shown), for example, which is a jig for preventing damage at the time of mating engagement which is provided in advance on the periphery of the short pipe 1.

After pipe insertion is completed, the stabbing guide is removed, and the oil well pipe 2 which is to be connected is rotated two to three turns by a strap wrench or by the strength of the operator to achieve a state in which the thread of the pin portion 2b of the oil well pipe 2 which is to be connected engages with the thread of the box portion 1a of the short pipe 1. Then, a prescribed torque is applied with power tongs, namely, with a torque-applying apparatus (not shown) to perform tightening.

Hand tightening which is carried out by an operator is rotation with a small torque (on the order of 19.6–576 N·m) which is only on the level of human strength. However, when the threads of the pin portion and the box portion are not completely engaged with each other, rotation will not take place with a torque on the order of 576 N·m, and a higher torque than that is necessary for rotation. This means that the state of engagement between the threads of the pin portion and the box portion is defective. In such a case, the operator performs fine adjustment by slightly raising the oil well pipe to be connected or slightly rotating it in the opposite direction to correct the misalignment. When fine adjustment is completed, it becomes possible to carry out rotation with the threads in engagement using a very small torque of at most 576 N·m, so the oil well pipe to be connected is rotated two to three turns in the tightening direction.

However, recently, off shore (in oil fields on the sea) and the like, there has developed a demand for tightening which does not require rotation of an oil well pipe by two to three turns by hand tightening by an operator after an oil well pipe is inserted using a stabbing guide. Thus, as shown in FIG. 8, automatic power tongs 3 grasp an oil well pipe 2 to be connected, and in this state, tightening corresponding to conventional hand tightening and power tightening are continuously carried out.

Hands-free power tongs of this type have a hydraulic drive apparatus (torque generating apparatus) and can easily apply a torque of 33810 N·m to an oil well pipe having an outer diameter on the order of 178 mm.

However, it is difficult to control the movement of such power tongs with applying a minute torque at a level of 576 N·m and it is difficult to carry out careful hand tightening on the order of 576 N·m which has been performed by an operator. Thus, tightening operation is always performed with a strong force, and when the threads are not completely engaged at the time of pipe insertion, damage to the threads may occur in some cases.

In the prior art, in JP H11-223284A, for example, a pipe joint has been proposed with which after the pin portion of an oil well pipe which is to be connected is inserted into the box portion of a short pipe, it can be screwed in as quickly as possible and with a small number of turns. This pipe joint is premised on it being ensured that the pin portion of the oil well pipe is inserted rightly in a vertical direction into the box portion of the short pipe using a stabbing guide or the like.

In addition, in the above-described Japanese patent publication, the stabbing relief angle β of the thread of the pin portion of the oil well pipe is sloped at 3 degrees. However, in the case of a buttress thread shape for a thread prescribed by API for oil well pipes (at least 16 inches) (406.4 mm)), from in the past, in order to improve thread engagement, the stabbing relief angle β has been prescribed as being parallel to the vertical, i.e., the stabbing relief angle equals 0 degrees. According to this view, theoretically, the engagement of the threads of the pin portion of an oil well pipe and of the box portion of a short pipe is guaranteed. Accordingly, if the stabbing relief angle β is made a daring angle, the thread height becomes small, and this leads to a decrease in the portion which receives axial force.

Furthermore, in the above-described Japanese patent publication, in order to improve engagement between threads at the time of pipe insertion, it is proposed to perform marking of the threads of the pin portion of an oil well pipe and the box portion of a short pipe in a location where it is easiest to perform engagement. Although it is not impossible for an operator to perform tightening until the marks are aligned, when it is dark such as at night, it is difficult to ascertain the marks, so this cannot necessarily be described as suitable technology.

DISCLOSURE OF THE INVENTION

Due to the introduction of new technology, when an oil well pipe is being lowered into an oil well, it is necessary to investigate various underground data (the temperature, pressure, depth, and the like), and for this purpose, there are cases in which a wire line (a connecting line for a sensor) is attached. In this case, in the conventional method in which a well is dug vertically as shown in FIG. 9(*a*), if the oil well pipe 2 swings near the vicinity of its axis, there is a great danger of the wire line 4 being severed.

In order to perform lowering of an oil well pipe into the ground without breaking the wire line 4, as shown in FIG.

9(b), a technique is being developed in which an oil well is dug at an angle of 1–1.5 degrees with respect to the vertical.

However, when employing such a technique, it is necessary for hand tightening and subsequent power tightening to be carried out in a state in which peripheral equipment is also tilted. There is no problem in performing hand tightening or power tightening if all equipment is maintained in a state in which it is tilted by 1–1.5 degrees with respect to the vertical, but there is a high likelihood of power tongs being horizontally installed, so at the time of hand tightening or power tightening, there is the possibility of tightening being carried out as if bending were being applied, and pipe joints come up against severe tightening conditions.

However, in the past, there have not been any proposals for remedying such a problem.

This invention was made in light of the above-described problems, and its object is to provide a pipe joint which can reduce galling of threads, with which tightening operations can be carried out in a satisfactory manner, and which can reduce the level of damage to threads which sometimes occurs, even when a pin portion which is to be connected to a box portion is not inserted in place reliably or when it is inserted inadequately, as encountered in the case in which an oil well is drilled with a tilt of 1–2 degrees, for example.

Another object of this invention is to provide a pipe joint which can reduce the level of damage to threads when tightening corresponding to hand tightening and power tightening is continuously carried out with power tongs even in the case in which a pin portion which is to be connected to a box portion is not inserted in place reliably or when it is inadequately inserted.

In the past, when a pin portion to be connected to a box portion was not reliably inserted in place or when it was inadequately inserted, fine engagement was carried out by the operator after pipe insertion. However, when there is the premise that such hand tightening by an operator is not carried out, in order to reduce galling of threads and achieve satisfactory ease of tightening, it is necessary to modify the shape of the joint itself so as to make fine engagement by hand tightening unnecessary.

When a pin portion is inserted in place vertically with respect to a box portion in which each portion has a tapered thread, engagement of the tapered male thread of the pin portion and the tapered female thread of the box portion can be roughly classified into the states shown in FIGS. 10(a)–(c). Of these, in the case shown in FIG. 10(c), the tapered male thread of the pin portion 2b and the tapered female thread of the box portion 1a are completely engaged with each other, and it is necessary to rotate them one to two further turns in order to carry out hand tightening with certainty, but it is not necessary to perform rotation in order to engage them with each other.

On the other hand, in the case of FIGS. 10(a) and (b), in order to go from these incompletely engaged states to the desirable engaged state shown in FIG. 10(c), it is necessary to perform rotation by one turn or 0.5 turns.

It is normally not easy to perform pipe insertion in place, i.e., to achieve the desirable engaged state shown in FIG. 10(c). Therefore, regardless which of the engaged states shown in FIGS. 10(a)–(c) occurs, it is desired for the pin portion to be able to rotate with a small resistance under a very small rotational force on the level of hand tightening (on the order of 576 N·m).

The present invention was made based on the results of various investigations with respect to the effect of thread shape on the ease of tightening at the time of pipe insertion and the amount of damage to threads. Thus, according to the present invention, in a pipe joint in which a pin portion having a tapered male thread formed on the outer peripheral surface of the end portion of a pipe is screwed into a box portion having a tapered female thread formed on the inner peripheral surface of the end of a pipe or a short pipe so as to threadingly engage with the tapered male thread, the clearance C between the stab flanks of the threads is made 0.5–1.0 mm, the stab flank angle θ of the threads is made 15–60 degrees, the thread crest surface and the thread root surfaces of the threadingly engaged tapered male thread and tapered female thread are made parallel to the pipe axis, the radius of curvature R of the rounded portions of the stab flank corners of the male thread (refer to below as the "male thread stab flank corner portions") is made 1.0–1.25 mm, and preferably the taper of an incomplete thread portion of the pin portion is made 0.96–0.90 times the nominal taper of a complete thread portion.

Thus, according to the present invention, even when a pin portion is not reliably inserted in place in a box portion or when it is not adequately inserted therein, whether tightening with power tongs is carried out after rotation by hand tightening or whether tightening is carried out by rotation with hands-free power tongs, it is made possible to decrease galling of threaded portions and perform tightening satisfactorily with decreasing the level of damage to threads which sometimes occurs during tightening.

According to the present invention, it is unnecessary to perform fine adjustment for realignment and subsequent adjustment of engagement by rotating 1–0.5 turns.

BEST MODES FOR CARRYING OUT THE INVENTION

Figure 1:
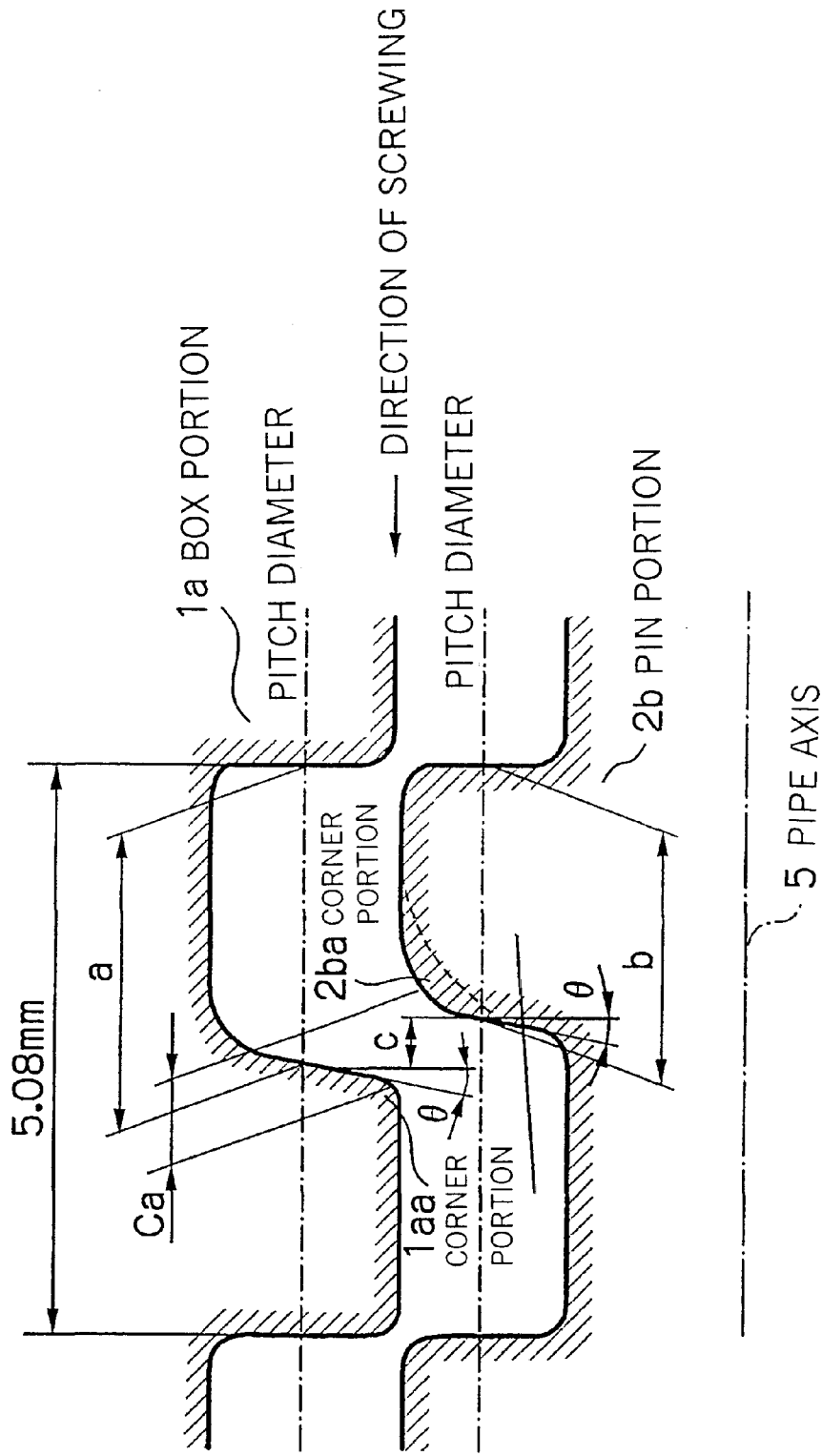
FIG. 1 is an explanatory view showing the thread shape of a pipe joint according to the present invention.

A pipe joint according to the present invention will be described while referring to the drawings.

Clearance C Between the Stab Flanks:

In FIG. 1, the clearance between the (thread) stab flanks of the pin portion 2b and the box portion 1a can be prescribed by the illustrated symbol "C". Thus, in the present invention, the clearance C is defined as the axial distance between the stab flanks of both threads when tightening of the threads is completed.

When this clearance C is zero (0), if pipe insertion is carefully performed and hand tightening is carried out, tightening of the threads is possible, but with a threaded joint for a tilted oil well pipe which is the subject of the present invention, there is a very large contact area between threads, and scratches can easily develop.

As the clearance C is increased, the looseness between threads increases, and the amount of freedom at the time of pipe insertion increases. However, according to experiments by the present inventors, if the clearance C exceeds 1.0 mm, essentially, the thread width b of the threads which receives axial force decreases to such a degree that it is impossible to withstand the required axial load, and the threads themselves end up deforming.

In contrast, when the clearance C is extremely small, due to elastic deformation at the time of tightening of the threads, the stab flanks of the pin portion and the stab flanks of the box portion contact, and galling may take place. However, the present inventors found that even if the clearance C is larger than such a value, there are restrictions on the ability to insert in place, assuming that the pin portion may be tilted when inserted into the box portion.

According to the results of a pipe insertion test performed by the present inventors, as the clearance C decreases, the ability to insert in place worsens, and when the clearance C becomes less than 0.5 mm taking into consideration the tolerance at the time of manufacture, the ability to insert in place worsens, and galling may occur in some cases. Therefore, the lower limit on the clearance C is made 0.5 mm.

Accordingly, the clearance C between the stab flanks is made 0.5–1.0 mm taking into consideration the tolerance at the time of thread manufacture.

Stab Flank Angle θ

The (thread) stab flank angle θ of the pin portion 2b and the box portion 1a is prescribed by θ in FIG. 1. The larger is this angle θ, the greater is the centering effect which can be expected by rubbing of the stab flanks of the threads of the pin portion 2b and the box portion 1a, and after pipe insertion, the threads are tightened in the aligned direction, so the extent of damage to the threads decreases. However, if this angle exceeds 60 degrees, the thread width b becomes so small that the threads of the pin portion 2b disappear. Thus, as an actual thread shape, the parallel portion of the threads can no longer be prescribed, and a BTC type thread shape can no longer be recognized.

On the other hand, the smaller is the stab flank angle θ, the greater is the bearing force with respect to the axial direction. However, when stabbing takes place at less than 15 degrees, striped scars and galling occur in the stab contact portions.

Therefore, in the present invention, the stab flank angle θ is in the range of 15–60 degrees.

Incidentally, this thread angle is 10 degrees in a usual BTC.

The Angle of the Thread Crest Surface and the Thread Root Surfaces of a Tapered Male Thread and a Tapered Female Thread With Respect to the Axis:

As the outer diameter of an oil well pipe increases, its weight also increases, and the load applied to each thread and the torque required for hand tightening also increase, so there is an overall tendency in pipe insertion and hand tightening to become more difficult. Accordingly, as a countermeasure, with a buttress thread for an oil well type prescribed by API, when the outer diameter is 16 inches (406.4 mm) or larger, the threads are prescribed as being parallel to the pipe axis such that the contact surfaces between the threads of the pin portion and the box portion after pipe insertion are made parallel to the axis with the intention of achieving a straightening effect at the time of hand tightening.

On the other hand, in the case of oil well pipes having an outer diameter of 13 and ⅜ inches (339.7 mm) or less, due to the long-established practice in the API standards that the philosophy for diameters of 16 inches (406.4 mm) or larger is not reflected in the standards for the smaller pipes, the threads thereof are prescribed as being parallel to the taper (1/16).

However, when a pin portion which is to be connected to a box portion is not reliably inserted in place or is not adequately inserted, on the presumption that fine engagement operation by an operator after pipe insertion is not permitted, in order to decrease galling of threaded portions and satisfactorily carry out tightening operations, it is preferable to employ the same philosophy as for a pipe of at least 16 inches (406.4 mm) even in oil well pipes of 13 and ⅜ inches (339.7 mm) or smaller.

In the present invention, regardless of the size of the outer diameter, the thread crest surfaces and the thread root surfaces of a tapered male thread and a tapered female thread, respectively, are prescribed as being parallel to the axis, i.e., to pipe longitudinal axis 5 in the nominal value, as shown in FIG. 1. Naturally, there is a prescribed tolerance, and in the present invention, it is prescribed as 0±0.2% expressed as a taper.

Radius of Curvature of the Stab Flank Corner Portions of the Male Thread

For a buttress thread for an oil well pipe prescribed by API, the radius of the corner portions 1aa of the stab receiving portions of the box portion 1a is prescribed as 0.2 mm. When inserting the pin portion 2b into the box portion 2a in a tilted state, contact first takes place between the corner portions 1aa of the stab receiving portions of the box portion 1a and the stab flank corner portions 2ba of the pin portion 2b. According to experiments by the present inventors, at the time of this contact, when the radius of curvature R (referred to below as "radius R") of the stab flank corner portions 2ba of the pin portion 2b is less than 1.0 mm, local stresses become large, and this becomes a cause of striped scars and galling.

On the other hand, as the radius R of the stab flank corner portions 2ba of the pin portion 2b becomes larger, the clearance Ca from the stab receiving portions of the box portion 1a can be increased. The larger this clearance Ca becomes, the greater the amount of freedom between the pin portion 2b and the box portion 1a at the time of pipe insertion. However, if the radius R of the stab flank corner portions 2ba of the pin portion 2b exceeds 1.25 mm, the parallel portions of the stab flanks of the pin portion 2b disappear, and it can no longer be recognized as a thread.

Therefore, in the present invention, the radius R of the stab flank corner portions 2ba of the male thread of the pin portion 2b is made 1.0–1.25 mm.

An API BTC thread has a corner portion radius R of a pin of 0.76 mm, but according to tests by the present inventors, when stabbing is performed in a tilted state, scarring of the corner portions took place. Therefore, by considering a tolerance of 0.25 mm, it was made 1.0 mm.

Increasing the radius of the corner portions of the stab receiving portions of the box portion is not desirable, since it decreases the stabbing area, can cause galling of the stab flanks, and decreases the stability of hand tightening for engaging threads.

Next, a more preferred mode of the present invention will be described.

Taper of the Incomplete Thread Portion of the Pin Portion

Figure 2:
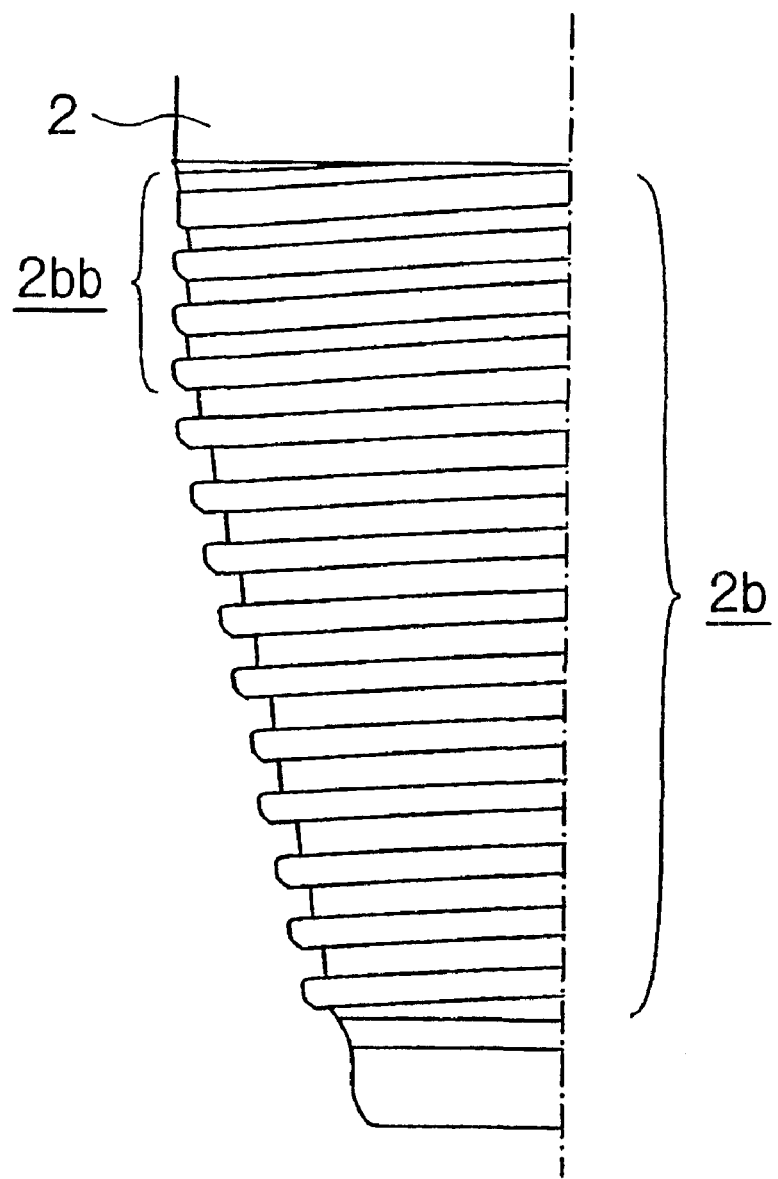
FIG. 2 is an explanatory view showing a threaded portion formed on a pin portion.

FIG. 2 is an explanatory view of a threaded portion formed on a pin portion.

Figure 3:
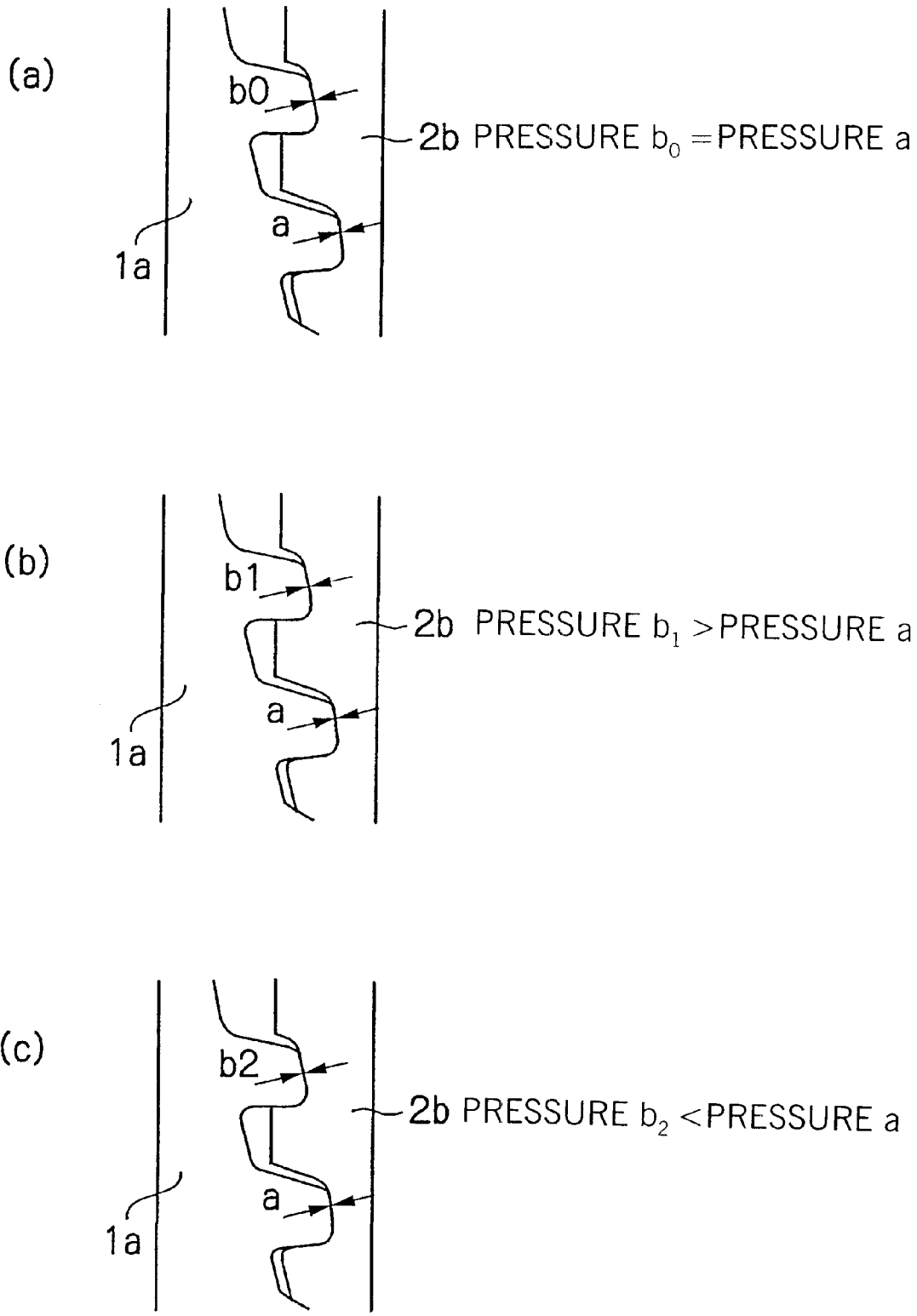
FIGS. 3(a)–(c) are schematic views for explaining the difference in the interference (surface) pressure, which is generated in the incomplete thread portion of a pin portion, due to a difference in taper between the incomplete thread portion of the pin portion and the complete thread portion of a box portion.

FIGS. 3(a)–(c) are views explaining the difference in interference pressure which is generated in the incomplete thread portion of a pin portion due to the difference in taper between an incomplete thread portion of a pin portion and a complete thread portion of a box portion.

As shown in FIG. 2, the incomplete thread portion 2bb of the pin portion 2b interferes with and is tightened to the complete thread portion of the box portion at the time of tightening of a joint.

At this time, as shown in FIG. 3(a), if the tapers of the incomplete thread portion 2bb of the pin portion 2b and the complete thread portion of the box portion 1a are the same, interference takes place just as designed between the thread roots of the pin portion 2b and the thread crests of the box portion 1a, and at the time of tightening, the pressure b0 which is generated by interference between the thread roots of the pin portion 2b and the thread crests of the box portion 1a in the incomplete thread portion 2bb becomes equal to the pressure a which is generated by interference between the thread roots of the pin portion 2b and the thread crests of the box portion 1a in the complete thread portion.

As shown in FIG. 3(b), when the taper of the incomplete thread portion 2bb of the pin portion 2b is larger than the taper of the complete thread portion of the box portion 1a, a large interference which is higher than the designed value is generated between the thread roots of the pin portion 2b and the thread crests of the box portion 1a, and at the time of tightening, the pressure b1 which is generated in the incomplete thread portion 2bb by interference between the thread roots of the pin portion 2b and the thread crests of the box portion 1a becomes larger than the pressure a in the complete thread portion, and galling occurs between the thread roots of the pin portion 2b and the thread crests of the box portion 1a in the incomplete thread portion 2bb.

In contrast, as shown in FIG. 3(c), when the taper of the incomplete thread portion 2bb of the pin portion 2b is smaller than the taper of the complete thread portion of the box portion 1a, the interference between the thread roots of the pin portion 2b and the thread crests of the box portion 1a becomes smaller than the designed value, and at the time of tightening, the pressure b2 which is generated by interference between the thread roots of the pin portion 2b and the thread crests of the box portion 1a in the incomplete thread portion 2bb becomes smaller than the pressure a in the complete thread portion, so even at the time of tightening, galling does not take place between the thread roots of the pin portion 2b and the thread crests of the box portion 1a in the incomplete thread portion 2bb.

When digging an oil well with a tilt of 1–2 degrees, the situation is such that bending is always applied, so regardless which of the above-described relationships exists between the taper of the incomplete thread portion of the pin portion and the taper of the complete thread portion of the box portion, in the incomplete thread portion of the pin portion, the surface corresponding to the inner side in bending (which is in a compressed state) has a higher value of the above-described interference pressure, while the surface which is 180 degrees on the opposite side corresponding to the outer side in bending (which is in a tensile state) has a lower thread interference pressure applied thereto.

Figure 4:
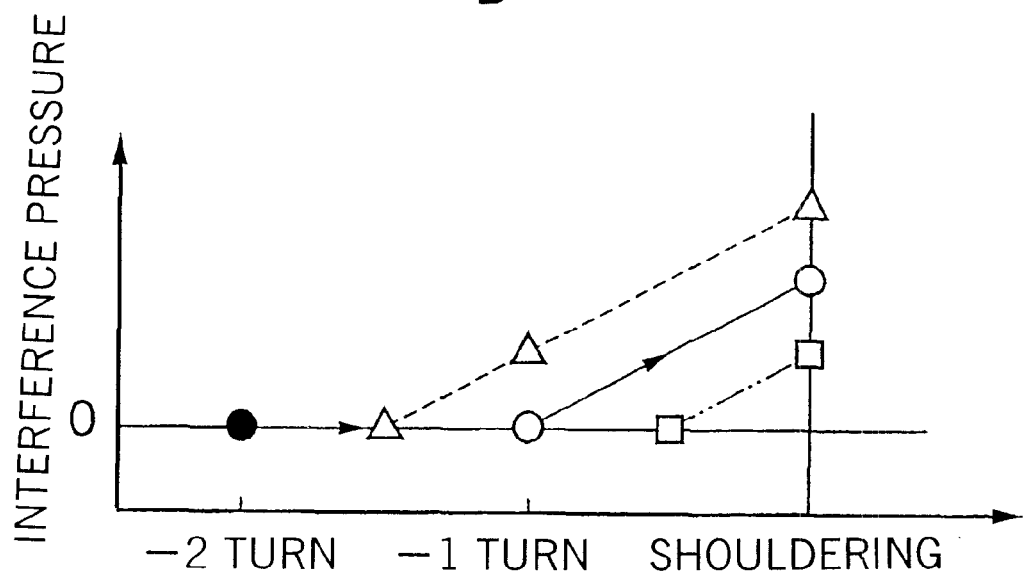
FIG. 4 is a graph showing the interference pressure which is generated in the incomplete thread portion of a pin portion at the time of tightening when a bending load is not applied.
Figure 5:
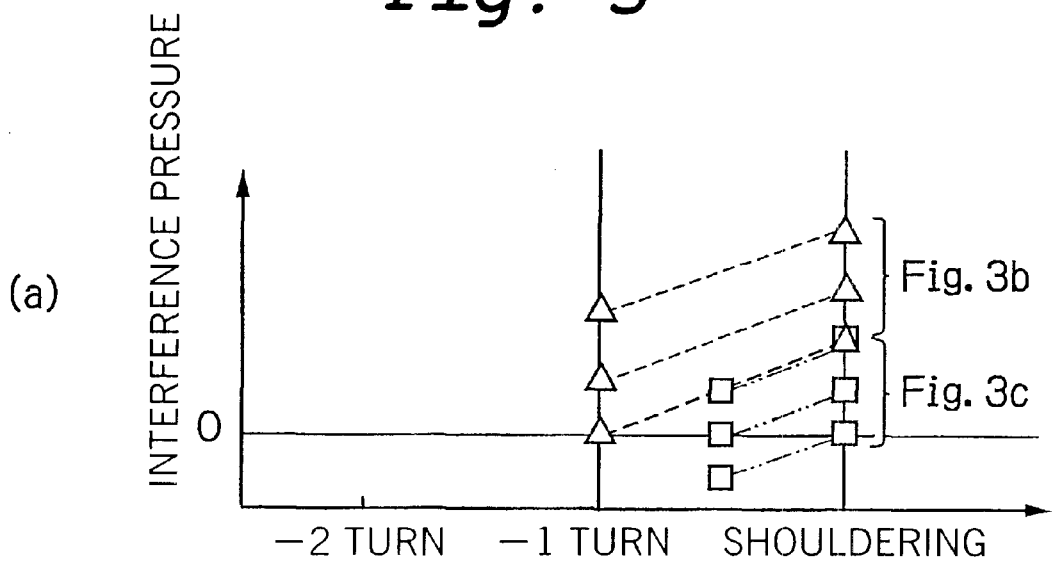
FIG. 5 is a graph showing the interference pressure which is generated in the incomplete thread portion of a pin portion at the time of tightening when a bending load is applied, FIG. 5(a) showing the case in which the taper of the incomplete thread portion of the pin portion is larger or smaller than the taper of the complete thread portion of the box portion, and FIG. 5(b) showing the case in which the taper of the incomplete thread portion of the pin portion is equal to the taper of the complete thread portion of the box portion.
Figure 5:
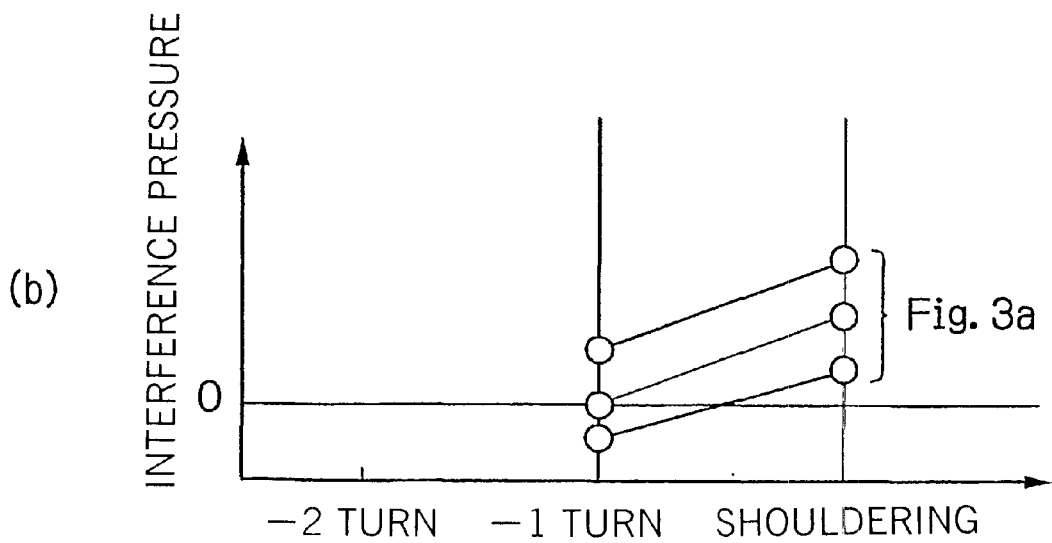

FIG. 4 shows the interference pressure in the threaded portion at the time of tightening for the case in which an oil well is dug vertically, and FIG. 5 shows the interference pressure in the threaded portion at the time of tightening for the case in which an oil well is dug with a tilt of 1–2 degrees.

In FIG. 4 and FIG. 5, the ○ marks indicate the interference pressure in the incomplete thread portion for the case in which the taper of the incomplete thread portion of the pin portion is the same as the taper of the complete thread portion of the box portion, the ∆ marks indicate the interference pressure in the incomplete thread portion for the case in which the taper of the incomplete thread portion of the pin portion is larger than the taper of the complete thread portion of the box portion, and the □ marks indicate the interference pressure in the incomplete thread portion for the case in which the taper of the incomplete thread portion of the pin portion is smaller than the taper of the complete thread portion of the box portion. These marks correspond to FIG. 3(a), FIG. 3(b), and FIG. 3(c), respectively.

The following is apparent from the results of FIG. 4.

When the taper of the incomplete thread portion of the pin portion is larger than the taper of the complete thread portion of the box portion (∆ marks), the interference pressure in the incomplete thread portion becomes higher, whereas when the taper of the incomplete thread portion of the pin portion is smaller than the taper of the complete thread portion of the box portion (□ marks), the interference pressure in the incomplete thread portion becomes smaller.

In addition, when the taper of the incomplete thread portion of the pin portion is equal to the taper of the complete thread portion of the box portion (○ marks), the interference pressure of the incomplete thread portion is located between the values for the above-described two cases.

Among the total of nine graphs for the ○ marks, the ∆ marks, and the □ marks in FIGS. 5(a) and (b), the graph in the upper position among the three graphs with the same mark indicates the interference pressure in the surface corresponding to the inner side during bending of a pipe joint, the graph in the middle position indicates the interference pressure in the surface corresponding to the neutral position during bending, and the graph in the lower position indicates the interference pressure in the surface corresponding to the outer side during bending.

As shown by the graphs for the ∆ marks in FIG. 5(a), when the taper of the incomplete thread portion of the pin portion is larger than the taper of the complete thread portion of the box portion, if a pipe joint is tightened in a tilted state, a large difference develops in the pressure in the thread interference portion between the left and right surfaces with respect to the axis of the pipe joint (the surface on the outer side in bending and the surface on the inner side in bending), and the absolute value of the interference pressure also becomes high.

In contrast, as shown by the □ marks, when the taper of the incomplete thread portion of the pin portion is smaller than the taper of the complete thread portion of the box portion, even if a pipe joint is tightened when in a tilted state, the difference in the pressure of the thread interference portions on the left and right surfaces with respect to the axis of the pipe joint becomes small, and the absolute value of the pressure also becomes small.

As shown by the graphs for the ○ marks in FIG. 5(b), when the taper of the incomplete thread portion of the pin portion is equal to the taper of the complete thread portion of the box portion, the interference pressure of the incomplete thread portion is a value between that for the above-described two cases.

Thus, by adjusting the taper of the incomplete thread portion of the tapered male thread, the distributed pressure of the threads when tightening is performed in a tilted state can be made the same as for the normal state in which tightening is performed in a vertical state.

In light of the above, in the present invention, the taper of the incomplete thread portion of the tapered male thread is preferably made smaller than the nominal taper of the complete thread portion. According to experiments by the present inventors, when an oil well was dug with a tilt of 1–2 degrees, when the taper of the incomplete thread portion was made 0.96–0.90 times the nominal taper of the complete thread portion, galling and striped scars did not occur in the incomplete thread portion. In the present invention, the taper of the incomplete thread portion of the pin portion is preferably in the range of 0.96–0.90 times the nominal taper of the complete thread portion.

For an API BTC thread, the nominal value of the thread taper of the pin portion is 6.25% and the tolerance is +0.35% −0.25% (written as "6.25%+0.35%−0.25%"), and the thread taper of the box portion is 6.25%±0.25%. Therefore, in order to make the thread taper of the pin portion smaller than the minimum thread taper of the box portion, the thread taper of the pin portion is preferably at most 6.0%. Thus, a taper ratio calculated as 6.0/6.25 is at most 0.96 times. In order for the threads to engage with certainty, it is not possible to greatly decrease the thread taper of the pin portion, and from the results of a tensile fracture test by the present inventors, it was found that the thread taper for a pin portion to be combined with a box portion having a maximum thread taper of 6.5% is preferably at least 5.8%. Thus, the ratio is preferably made at least 0.9 times.

A deterioration in tensile fracture strength is observed at less than 0.9 times.

In order to satisfy the above-described relationship, it is necessary to have a limitation on the manufacturing tolerance of the thread taper of the box portion, which is typically 0.3%.

Accordingly, the thread taper of the box portion is preferably made 6.0%–6.30%.

EXAMPLES

The result of experiments which were carried out in order to confirm the effects of the pipe joint according to the present invention will be described.

The present inventors investigated the effect of thread shape on the ease of tightening and damage to threads after pipe insertion using an oil well pipe having an outer diameter of 177.8 mm and a wall thickness of 11.51 mm.

The thread shape which was used is shown in Table 1, and the experimental results are shown in Table 2. The symbols used in Table 1 are the same as shown in FIG. 1. However, "R" is the radius of curvature of the stab flank corner portions 2ba of the male thread.

Figure 6:
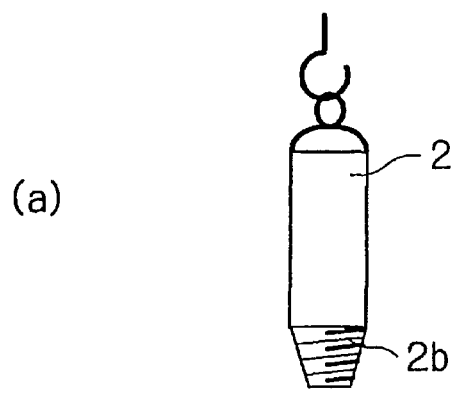
FIG. 6 provides explanatory views showing the method used in a pipe insertion test, FIG. 6(a) showing the case of inserting a pipe vertically, and FIG. 6(b) showing the case of inserting a pipe in a tilted state.
Figure 6:
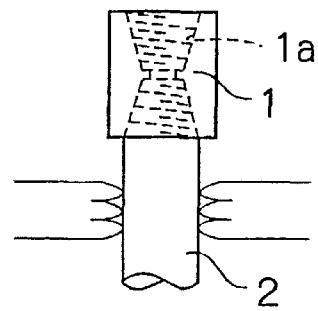
Figure 6:
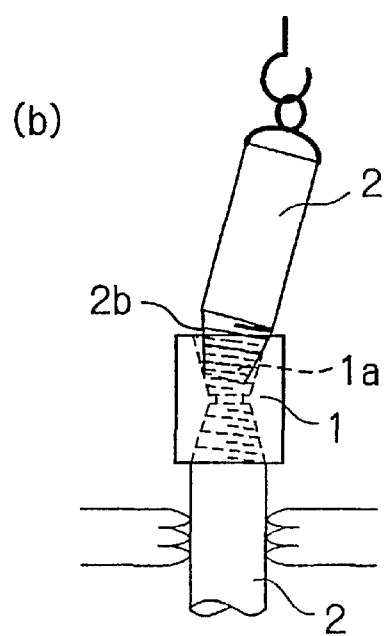
Figure 7:
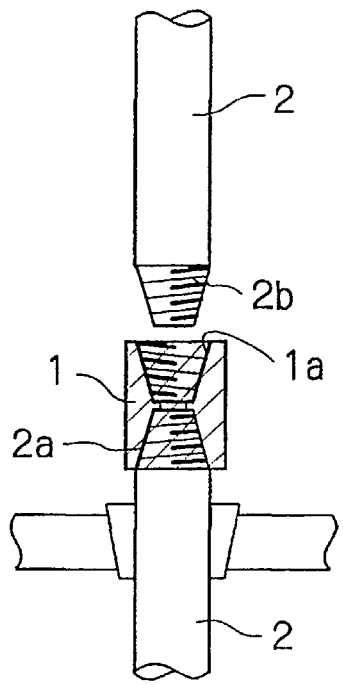
FIG. 7 is an explanatory view of a tightening operation of a coupling-type pipe joint.
Figure 8:
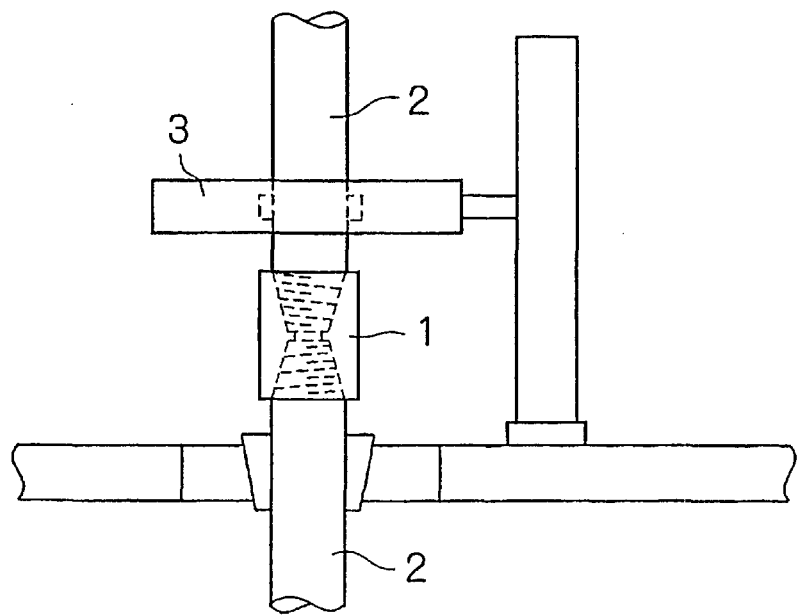
FIG. 8 is an explanatory view of a tightening operation using power tongs.
Figure 9:
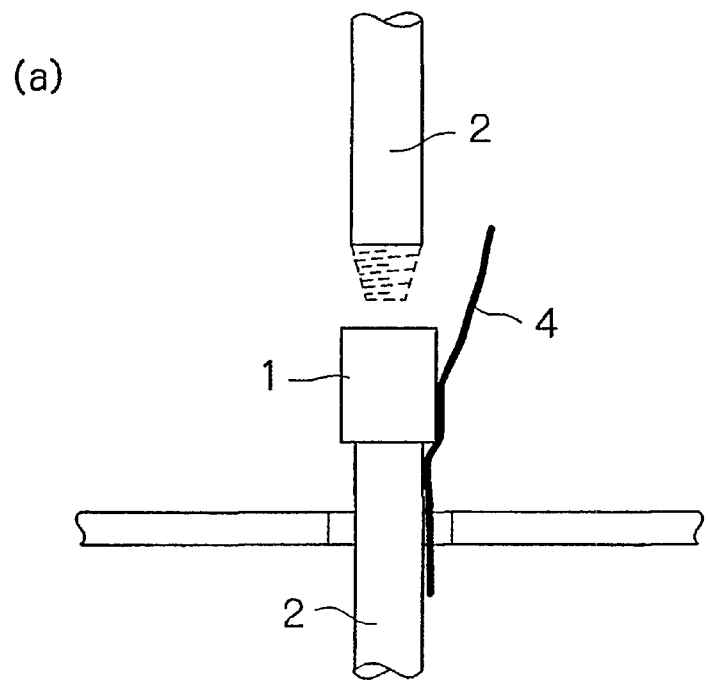
FIG. 9 provides explanatory views showing the case in which a wire line is installed, FIG. 9(a) showing a vertical state and FIG. 9(b) showing a tilted state.
Figure 9:
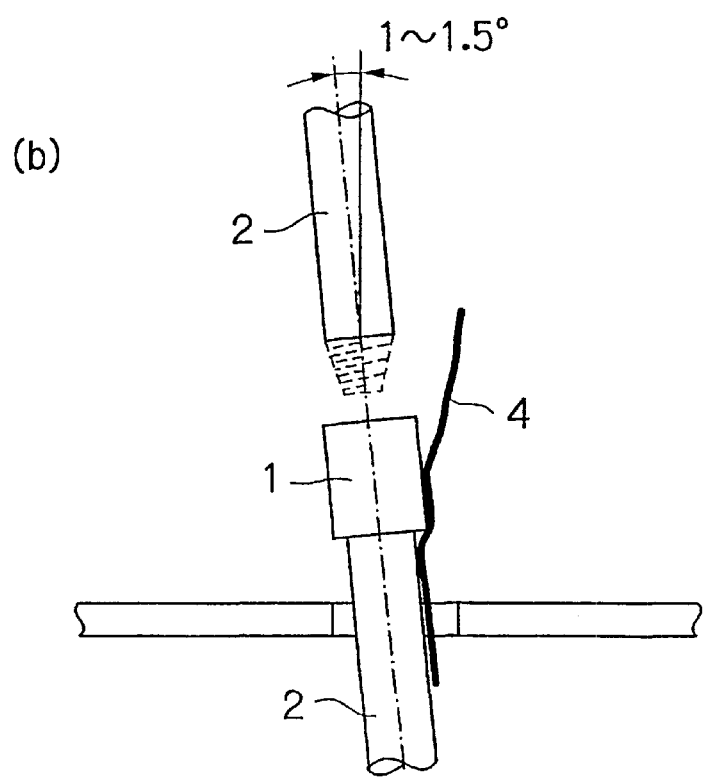
Figure 10:
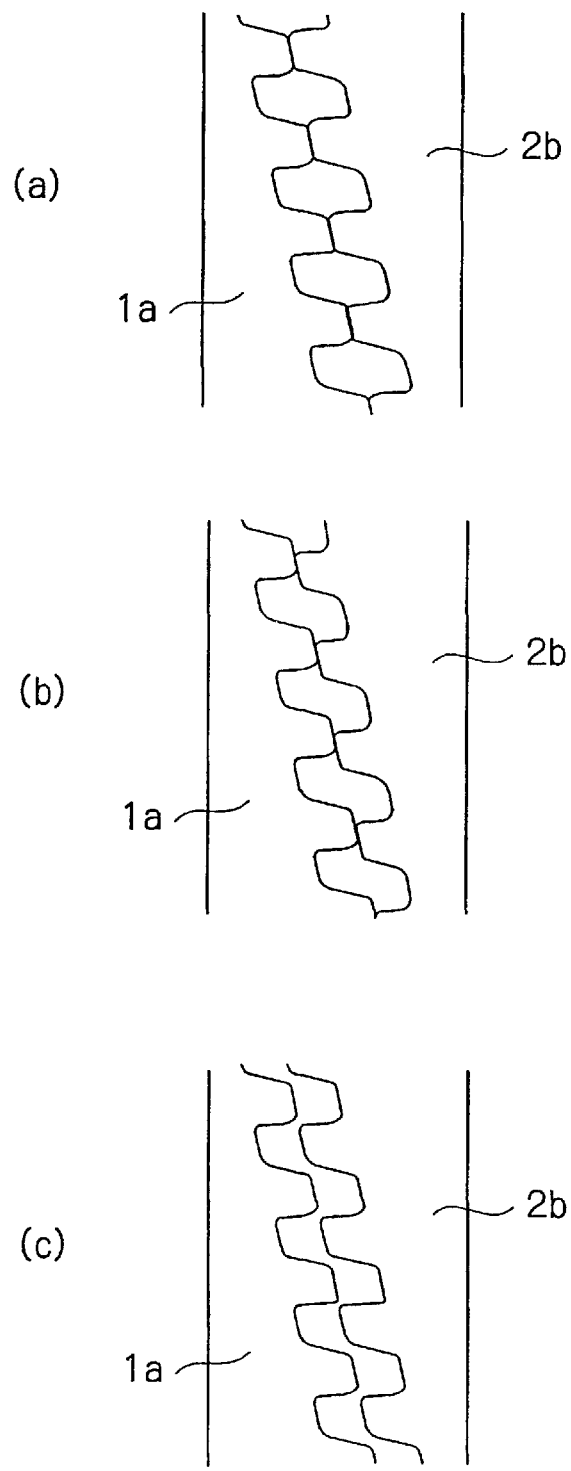
FIGS. 10(a)–(c) are schematic views for explaining the states of engagement of threads at time of pipe insertion.

In order to evaluate the ability to insert in position, the ease of hand tightening and the level of damage to threads were investigated for API threads for oil well pipes having various dimensions and having a thread shape in the form of a buttress thread (a pitch of 5 threads per inch) for the case in which an oil well pipe 2 was vertical when mated as shown in FIG. 6(a) and for the case in which the oil well pipe 2 was inserted in an intentionally tilted state at an angle of 0.4 degrees, 0.8 degrees, 1.2 degrees, 1.6 degrees, or 2.5 degrees such that alignment did not take place as shown in FIG. 6(b).

TABLE 1

| No. | a (mm) | b (mm) | c (mm) | R (mm) | θ (° C.) | Relation of Threads to the Axis | Taper of Incomplete Thread Portion | Remarks |
|---|---|---|---|---|---|---|---|---|
| 1 | 2.57 | 2.54 | 0.03 | 0.76 | 10 | non-parallel | 1.0 times[1] | |
| 2 | 2.505 | 2.475 | 0.03 | 0.76 | 10 | " | " | |
| 3 | 2.605 | 2.475 | 0.13 | 0.76 | 10 | " | " | |
| 4 | 2.505 | 2.475 | 0.03 | 0.76 | 15 | " | " | |
| 5 | 2.505 | 2.475 | 0.03 | 0.76 | 25 | " | " | |
| 6 | 2.505 | 2.475 | 0.03 | 0.76 | 60 | " | " | |
| 7 | 2.755 | 2.505 | 0.25 | 0.76 | 10 | " | " | |
| 8 | 2.755 | 2.225 | 0.50 | 0.76 | 10 | " | " | |
| 9 | 2.755 | 1.755 | 1.00 | 0.76 | 10 | " | " | |
| 10 | 2.755 | 2.225 | 0.50 | 0.76 | 10 | parallel | " | |
| 11 | 2.755 | 2.225 | 0.50 | 0.76 | 25 | " | 0.90 times | |
| 12 | 2.755 | 2.225 | 0.50 | 1.00 | 10 | non-parallel | 1.0 times[1] | |
| 13 | 2.755 | 2.225 | 0.50 | 1.00 | 10 | parallel | 0.96 times | |
| 14 | 2.755 | 2.505 | 0.50 | 1.00 | 15 | " | 1.0 times[1] | This invention |
| 15 | 2.755 | 2.505 | 0.25 | 1.25 | 25 | " | 0.96 times | |
| 16 | 2.755 | 2.005 | 0.75 | 1.25 | 25 | " | 1.0 times[1] | This invention |
| 17 | 2.755 | 2.005 | 0.50 | 1.25 | 25 | " | 0.90 times | This invention |
| 18 | 2.755 | 2.005 | 0.75 | 1.25 | 25 | " | " | This invention |
| 19 | 2.755 | 2.005 | 0.90 | 1.25 | 25 | " | " | This invention |
| 20 | 2.755 | 1.755 | 1.00 | 1.25 | 60 | " | 0.96 times | This invention |
| 21 | 2.755 | 1.755 | 1.50 | 1.00 | 25 | " | " | |
| 22 | 2.755 | 1.755 | 0.50 | 1.50 | 25 | " | " | |
| 23 | 2.755 | 1.755 | 0.50 | 1.00 | 70 | " | " | |

TABLE 1-continued

| No. | a (mm) | b (mm) | c (mm) | R (mm) | θ (° C.) | Relation of Threads to the Axis | Taper of Incomplete Thread Portion | Remarks |
|---|---|---|---|---|---|---|---|---|
| 24 | 2.755 | 1.755 | 0.50 | 1.00 | 25 | non-parallel | " | |
| 25 | 2.755 | 1.755 | 0.50 | 1.00 | 25 | parallel | 0.85 times | This invention |

[1]1.0 times within tolerance

TABLE 2

| | Pipe Insertion Test | | | | | | |
|---|---|---|---|---|---|---|---|
| No. | 0° | 0.4° | 0.8° | 1.2° | 1.6° | 2.5° | Remarks |
| 1 | ○ | ○ | X | — | — | — | Poor test results |
| 2 | ○ | Δ | X | — | — | — | " |
| 3 | ○ | Δ | X | — | — | — | " |
| 4 | ○ | ○ | ○ | Δ | X | — | " |
| 5 | ○ | ○ | ○ | ○ | Δ | X | " |
| 6 | ○ | ○ | ○ | ○ | ○ | Δ | Galling of threads occurred |
| 7 | ○ | ○ | Δ | X | — | — | Poor test results |
| 8 | ○ | ○ | ○ | Δ | X | — | " |
| 9 | ○ | ○ | ○ | ○ | Δ | X | " |
| 10 | ○ | ○ | ○ | ○ | Δ | X | " |
| 11 | ○ | ○ | ○ | ○ | ○ | Δ | Galling of threads occurred |
| 12 | ○ | ○ | ○ | ○ | Δ | X | Poor test results |
| 13 | ○ | ○ | ○ | ○ | ○ | Δ | Galling of threads occurred |
| 14 | ○ | ○ | ○ | ○ | ○ | Δ | This invention |
| 15 | ○ | ○ | ○ | ○ | ○ | Δ | Galling of threads occurred |
| 16 | ○ | ○ | ○ | ○ | ○ | Δ | This invention |
| 17 | ○ | ○ | ○ | ○ | ○ | ○ | " |
| 18 | ○ | ○ | ○ | ○ | ○ | ○ | " |
| 19 | ○ | ○ | ○ | ○ | ○ | ○ | " |
| 20 | ○ | ○ | ○ | ○ | ○ | ○ | " |
| 21 | ○ | ○ | ○ | ○ | ○ | ○ | Poor joint compressibility |
| 22 | ○ | ○ | ○ | ○ | ○ | ○ | Damage to trapezoidal threads |
| 23 | ○ | ○ | ○ | ○ | ○ | ○ | Damage to trapezoidal threads |
| 24 | ○ | ○ | ○ | ○ | ○ | Δ | Galling of threads occurred |
| 25 | ○ | ○ | ○ | ○ | ○ | ○ | This invention, Joint tensil strength decreased |

First, confirmation was carried out on No. 1–No. 3 in the above Table 1.

As can be seen from the results of Table 2, it was found that there is no problem with a conventional thread shape if alignment can be carried out with certainty, but, as tilting gradually takes place from 0.4 degrees to 0.8 degrees, damage to the thread surface takes place due to unsteady contact (a state in which bending is locally applied) between the male thread and the female thread. Pipe insertion became impossible when the angle of tilt exceeded 1.2 degrees.

In Table 2, a round mark (○) indicates that hand tightening was possible with no damage to the threaded portions, a triangular mark (Δ) indicates that hand tightening was possible but some portions suffered thread crest damage which was capable of being repaired, an X-like mark (×) indicates that hand tightening was possible but there were many instances of thread damage which could not be repaired, and a minus mark (–) indicates that pipe insertion was not possible.

Next, the effect of the stab flank angle θ was investigated for Nos. 4–6, 12, and 23, and the effect of the clearance C between the stab flanks was investigated for Nos. 7–9, 15, and 21. Furthermore, the effect of the angle of the thread crest surfaces and the thread root surfaces of a tapered male thread and a tapered female thread, respectively, relative to the axis was investigated for Nos. 8, 10, 20, and 24, the effect of the radius R of the stab flank corner portions of the male thread was investigated for Nos. 10, 11, 12, 13, 17, and 22, and the effect of the taper of the incomplete thread portion of the pin portion was investigated for Nos. 12–20 and 25.

From the results of Table 2, the items listed below were found.

(1) A good result is obtained with a larger stab flank angle θ, with a suitable range being 15–60 degrees.

(2) A good result is obtained with a larger clearance C between the stab flanks, with a suitable range being 0.5–1.0 mm.

(3) It is preferable for the thread crest surfaces and the thread root surfaces of the tapered male thread and the tapered female thread to be parallel to the axis. Here, parallel to the axis means a taper with respect to the axis of 0±0.2% (compare Nos. 8, 10, 20, and 24).

(4) A good result is obtained with a larger radius R of the stab flank corner portions of the male thread, with a suitable range being 1.0–1.25 mm.

(5) A better result is obtained when the taper of the incomplete thread portion of the pin portion is smaller than the taper of the complete thread portion, with a suitable range being 0.90–0.96 times (compare Nos. 12, 13, 16, 18–20, and 25).

From the results of Table 2, it was confirmed that with Nos. 14, 16–20, and 25 which satisfied all the ranges of the present invention, even when a well is dug with a tilt of 1.5 degrees or more, an adequate tightening ability can be obtained and damage to threads can be prevented.

In addition, for Nos. 17–20 which satisfied a preferred range for the taper of the incomplete thread portion of the pin portion, an even more excellent tightening ability and prevention of damage could be achieved.

In this specification, a coupling-type pipe joint has been described, but a pipe joint according to the present invention can of course also be applied to an integral pipe joint. In addition, a pipe joint according to the present invention can of course also be applied to one having a metal seal portion.

INDUSTRIAL APPLICABILITY

As described above, with a pipe joint according to the present invention, even when a pin portion is not reliably inserted in place in a box portion or when it is inadequately inserted, galling of threaded portions can be decreased, tightening operations can be satisfactorily carried out, and the level of damage to threads which sometimes occurs thereby can be decreased.

What is claimed is:

1. A pipe joint having a pin portion with a tapered male thread formed on the outer peripheral surface of the end of a pipe, and a box portion having a tapered female thread formed on the inner peripheral surface of the end of a pipe or a short pipe so as to threadingly engage with the tapered male thread, characterized in that a clearance C between stab flanks of the threads is 0.5–1.0 mm, a thread stab flank angle θ is 15–60, thread crest surfaces and the thread root surfaces of threadingly engaged tapered male thread and tapered female thread are parallel to a pipe axis, and a radius R of stab flank corner portions of the male thread is 1.0–1.25 mm.

2. A pipe joint as set forth in claim 1, characterized in that a taper of an incomplete thread portion of the pin portion is 0.96–0.90 times a nominal taper of a complete thread portion of the pin portion.

3. A pipe joint as set forth in claim 1 characterized in that the joint is a coupling-type joint.

4. A pipe joint as set forth in claim 1 characterized in that the joint is an integral joint.

5. A pipe joint as set forth in claim 1 wherein the pipe joint is tightened in a state in which it is tilted 1–2 degrees to vertical.

* * * * *

UNITED STATES PATENT AND TRADEMARK OFFICE
CERTIFICATE OF CORRECTION

PATENT NO. : 6,698,802 B2
DATED : March 2, 2004
INVENTOR(S) : Shigeo Nagasaku et al.

It is certified that error appears in the above-identified patent and that said Letters Patent is hereby corrected as shown below:

Column 13,
Line 6, "..., thread crest surfaces and the thread root surfaces of threadingly engaged..." should read -- ..., thread crest surfaces and thread root surfaces of the threadingly engaged... --

Signed and Sealed this

Tenth Day of August, 2004

JON W. DUDAS
*Acting Director of the United States Patent and Trademark Office*